(12) United States Patent
Naccache

(10) Patent No.: US 7,800,502 B2
(45) Date of Patent: Sep. 21, 2010

(54) PROCESS FOR DETERRING THE THEFT OF NOTES, NOTE, CORRESPONDING INACTIVATION DEVICE AND ACTIVATION DEVICE

(75) Inventor: David Naccache, Paris (FR)

(73) Assignee: "Compagnie Industrielle et Financiere d'Ingenierie" Ingenico, Neuilly sur Seine (FR)

( * ) Notice: Subject to any disclaimer, the term of this patent is extended or adjusted under 35 U.S.C. 154(b) by 431 days.

(21) Appl. No.: 11/924,320

(22) Filed: Oct. 25, 2007

(65) Prior Publication Data

US 2008/0100449 A1 May 1, 2008

(30) Foreign Application Priority Data

Oct. 25, 2006 (FR) .................................. 06 09390

(51) Int. Cl.
*G08B 13/14* (2006.01)
*G06F 7/04* (2006.01)
(52) U.S. Cl. .................................. 340/572.3; 340/5.86
(58) Field of Classification Search ................ 340/5.86, 340/568.1–572.9, 10.1–10.5
See application file for complete search history.

(56) References Cited

U.S. PATENT DOCUMENTS

| 4,114,140 | A | * | 9/1978 | Kubina | 340/5.8 |
|---|---|---|---|---|---|
| 5,475,205 | A | * | 12/1995 | Behm et al. | 235/375 |
| 6,025,780 | A | * | 2/2000 | Bowers et al. | 340/572.3 |
| 6,547,151 | B1 | | 4/2003 | Baldi | 235/492 |
| 6,659,353 | B1 | * | 12/2003 | Okamoto et al. | 235/492 |
| 7,159,241 | B1 | * | 1/2007 | Horiguchi et al. | 726/10 |
| 7,463,150 | B2 | * | 12/2008 | Rajan | 340/572.1 |
| 7,548,164 | B2 | * | 6/2009 | Guez et al. | 340/572.3 |
| 2007/0200682 | A1 | * | 8/2007 | Colby | 340/10.51 |
| 2007/0226501 | A1 | * | 9/2007 | Saitoh | 713/170 |
| 2008/0197972 | A1 | * | 8/2008 | Lawson et al. | 340/5.86 |
| 2008/0218348 | A1 | * | 9/2008 | August et al. | 340/572.1 |
| 2009/0009285 | A1 | * | 1/2009 | Corry et al. | 340/5.86 |

FOREIGN PATENT DOCUMENTS

WO    WO 2006/092626    9/2006

OTHER PUBLICATIONS

A. Juels et al., "The Blocker Tag: Selective Blocking of RFID Tags for Consumer Privacy," Conference on Computer and Communications Security ACM Press, XP002432174, Oct. 2003, pp. 1-9.
G. Avoine, "Privacy Issues in RFID Banknote Protection Schemes," XP-002432154, Http://pmlab.iecs.fcu.edu.tw/PP/Papers/RF/Avoi04.pdf>, Aug. 27, 2004, pp. 33-48.

* cited by examiner

*Primary Examiner*—Jennifer Mehmood
(74) *Attorney, Agent, or Firm*—David D. Brush; Westman, Champlin & Kelly, P.A.

(57) ABSTRACT

A process is provided for deterring the theft of notes equipped with a radio-tag type authenticity check element, capable of returning an item of authenticity information, in response to an authentication request emitted by a check device. Such a process includes the following steps: transmission to the check element of at least one inactivation code, rendering the note invalid; storage and/or transport of the invalid note; and reactivation of the check element, using at least one activation code, depending on the inactivation code, rendering the note valid.

14 Claims, 4 Drawing Sheets

PROCESS FOR DETERRING THE THEFT OF NOTES, NOTE, CORRESPONDING INACTIVATION DEVICE AND ACTIVATION DEVICE

CROSS-REFERENCE TO RELATED APPLICATION

None.

FIELD OF THE DISCLOSURE

The field of the disclosure is that of deterring the theft of notes.

More particularly, the disclosure applies to making secure the transport of notes (bank notes, concert tickets, etc) using electronic tags, or radio-tags.

BACKGROUND

1. Deterring Theft

There are several techniques for making secure the transport of notes, notably for bank notes.

Currently, bank notes are transported by means of fund transport companies and require the use of very expensive labour, and involve very high risks for the employees of the companies that are responsible for providing the security of this transport.

However, the transport of funds often suffers hold-ups, often violent, and in all cases which cause financial prejudice (for the merchant, the bank and the transport company).

Different solutions, in addition to making secure the transport vehicles (armour plating, arms, etc.), have been proposed, such as the use of special cases which deposit a special indelible ink onto the notes. However, this approach is costly and destructive.

The same problems exist, sometimes to a lesser extent, for other types of notes and tickets, such as those for shows or sporting events.

2. Deterring Counterfeits

Furthermore, to make the notes secure, the notes themselves have marks, which permit them to be authenticated and permit counterfeits to be restricted or prevented.

In general, the marking techniques used for notes are very advanced and are regularly updated according to the technical progress made in the field, with the use for example of serial numbers, water marks, holograms, magnetic strips, etc.

As concerns bank notes, several studies are currently in progress to provide them with a radio-identification system to mark the notes.

This system, commonly called RFID (Radio Frequency Identification), is composed of markers, or radio-tags, themselves composed of a chip and an antenna, wherein the chip is not powered and uses the energy from a signal received to return a response signal and of receivers or readers.

In one of these studies, specially commissioned by the European Bank to make Euro notes more secure, it is thus proposed to incorporate radio-tags onto the bank notes, as an additional mark, thus permitting stolen notes to be located or counterfeit notes to be detected.

These obstacles to fraudulent reproduction are of course essential, to avoid the circulation of counterfeit money. They permit counterfeiters to be combated, but unfortunately increase the interest, for dishonest people, to steal real notes, notably during their transport or storage.

SUMMARY

An aspect of the present disclosure relates to a process for deterring the theft of notes equipped with an authenticity check element of the radio-tag type, capable of returning an item of authenticity information, in response to an authentication request emitted by a checking device.

Such a process comprises the following steps:
transmission to said check element of at least one inactivation request, rendering the note invalid;
delivery by said note of at least one activation code or at least one item of information permitting said activation code to be reconstructed;
secured transmission of at least said one activation code or at least said one information permitting said activation code to be reconstructed, to an activation device;
storage and/or transport of said invalid note;
re-activation of said check element by said activation device, using at least said one activation code, rendering said note valid.

In this way, an aspect of the disclosure is based on a novel and inventive approach for deterring the theft of notes, by rendering them invalid, or inactive, temporarily, notably during their transport, for example between a merchant and a bank. In fact, in one particular characteristic of the disclosure, these notes are rendered non reactive or non authenticatable by any device which checks their authenticity.

The process is non destructive. It permits of course the notes to be made once again valid, in order that they may be placed back into circulation. In this way, once these notes have been transported and received by the bank for example, they are reactivated so that they become once again valid. However, an additional specific code may be provided, rendering the note definitively inactive.

In particular, the process may comprise one secured transmission step of at least one activation code or of at least one item of information permitting said activation code to be reconstructed, to an activation device.

In this way, to permit the bank for example to reactivate the notes received in order to place them back into circulation, a reactivation device transmits a code, or an item of information, to each note. This information may notably comprise one or several items of data corresponding to or permitting the reconstruction of the activation code.

In one specific characteristic of the disclosure, said secured transmission step may be carried out via Internet.

Other modes of transmission (telephone network, dedicated network, data supports such as CD-ROMs or a USB device, etc.) may of course be used. It is also possible that the bank to which the notes are addressed knows in advance the codes entrusted to the merchant, or has tools which permit them to be reconstituted.

In a first advantageous embodiment, at least one said activation code is provided for each said note following the receipt of said inactivation request.

In this way, the note provides the activation code itself permitting it to be reactivated later. This activation code is preferably unique and dependent on the inactivation request, so that the note only accepts reactivation by this activation code. The note may have this code, for example stored as soon as the note is placed in circulation, or it may even be calculated, notably dependent on the inactivation request.

In a second advantageous embodiment, which may possibly be combined with the first, said inactivation request comprises at least one inactivation code, designed to be stored by said note upon receipt of said inactivation request. Said activation code is then dependent on said inactivation code.

In this case, the note compares (using an appropriate algorithm), during reactivation, the activation code to the stored inactivation code, received in the inactivation request.

In other terms, depending on the embodiments, the activation code may be provided by the note and/or by the inactivation device.

In particular, said inactivation and/or activation codes may be obtained using an algorithm belonging to the group comprising:

numbering algorithms;
MAC type algorithms;
hash algorithms.

For example, algorithms of the AES type ("Advanced Encryption Standard"), DES type ("Data Encryption Standard") or HMAC-SHA type ("keyed-Hash Message Authentication Code—Secure Hash Algorithm" may be used.

Preferably, said notes may have at least the two states belonging to the group comprising:

an active state, in which a note is capable of returning an item of authenticity information, in response to an authentication request;
an inactive state, in which a note does not return a response, following an authentication request, or provide a non authenticity response.

In this way, a note in the active state is capable of responding correctly to an authentication request, emitted for example during a purchase by the payment terminal responsible for verifying the validity of the notes. In return, a note in the inactive state is not capable of responding correctly to an authentication request.

For example, during an authenticity check of a note, a note in the inactive state may either not reply, or return an item of non authenticity or false note information, and thus be identified as being issued from a theft during a transport of invalid notes.

It is possible to provide furthermore, in the presence of an inactive note, a traceability step, permitting the determination of the origin of the note concerned (from which theft) to be established.

Furthermore, when said note equipped with said check element in the active state, it is preferably capable of responding to at least one request belonging to the group comprising:

an authentication request;
an inactivation request.

In this way, classically, a note in the active state may thus respond correctly to an authentication request. The note is moreover capable of receiving and processing a specific inactivation request.

In particular, when said note equipped with said check element is in the active state and receives an inactivation request, said process comprises advantageously an inhibition step, per said check element, of the capacity to respond to an authentication request, causing said note to switch to the inactive state.

In this way, when the note, in the active state, receives an inactivation request, the radio-tag with which is equipped switches to a deactivated mode, in which it does not respond to an authentication request or emit an item of non-authenticity information.

When said note is in the inactive state and receives an activation request, comprising at least one activation code, the activation device and/or the note use the following steps:

verification of the validity of the activation code received dependent on the activation code delivered by said note, and delivery of an item of validity information, positive or negative, for the reactivation;
switching of said note to the active state, if said validity information is positive.

In this way, when the radio-tag of a note in the inactive state receives an activation request, it uses a verification mechanism for the validity of the activation code received, for example dependent on the activation code delivered by the note. This verification may also consist of a combination of the activation code received in the activation request, and the inactivation code stored during the inactivation step, dependent on a predetermined algorithm.

If the reactivation request is validated, then the radio-tag of the note switches to a reactivated or valid mode, allowing the note to be used again.

However, if the reactivation request is not validated, for example because the activation codes received and provided do not correspond, then the radio-tag of the note remains in a deactivated or invalid mode. A permanent blocking mechanism may be provided in the deactivated mode (or the passage to a "definitively inactive" mode) in certain conditions, and for example beyond a predetermined number of reactivation attempts, or beyond a predetermined lapse of time.

Another aspect of the disclosure relates to the notes used in the process described above. Such a note is equipped with a radio-tag type authenticity check element, capable of returning an item of authenticity information, in response to an authentication request emitted by a checking device.

This check element comprises:

inactivation means, in response to an inactivation request, rendering said note invalid;
means of delivery of at least one activation code or at least one item of information permitting said activation code to be reconstructed;
re-activation means, using at least one activation code, rendering said note valid.

Yet another aspect of the disclosure relates to an inactivation device of a radio-tag type authenticity check element which equips a note as previously described, designed to be used for example by a merchant.

Such an inactivation device comprises the following means:

means for transmitting to said check element at least one inactivation request, rendering the note invalid;
means of storing at least one activation code or at least one item of information permitting said activation code to be reconstructed, delivered by said note, for the re-activation of said check element.

Advantageously, such an inactivation device comprises means of transmitting to at least one activation device an activation code, capable of rendering the note valid.

The disclosure also relates to an activation device of a radio-tag type authenticity check element which equips a note as previously described, which may for example be used by a bank.

According to the disclosure, such an activation device comprises:

means of receiving at least one activation code or at least one item of information permitting said activation code to be reconstructed, delivered by said note;
means for transmitting to said check element at least one activation code, rendering the note valid.

In certain cases, inactivation and activation devices may be provided, regrouping the means of the two devices described above. These different devices may further comprise means, themselves known, for the authentication of notes.

BRIEF DESCRIPTION OF THE DRAWINGS

Other characteristics and advantages will become clearer after reading the following description of a specific embodiment, provided purely by way of example as an illustration and in no way restrictively, and the appended drawings among which.

DETAILED DESCRIPTION OF ILLUSTRATIVE EMBODIMENTS

The general principle of an exemplary aspect of the disclosure is therefore based on the use of a system of radio-identification on the notes and the inactivation and the reactivation of the radio-tags.

More precisely, in one specific embodiment of the disclosure, such a process permits a radio-tag to be rendered inactive so as to make a note non reactive or non authenticatable by any device checking its authenticity.

For reasons of simplification, in the following description the term note will be used to designate the note itself and the check element, or the radio-tag, with which it is equipped.

Figure 1:
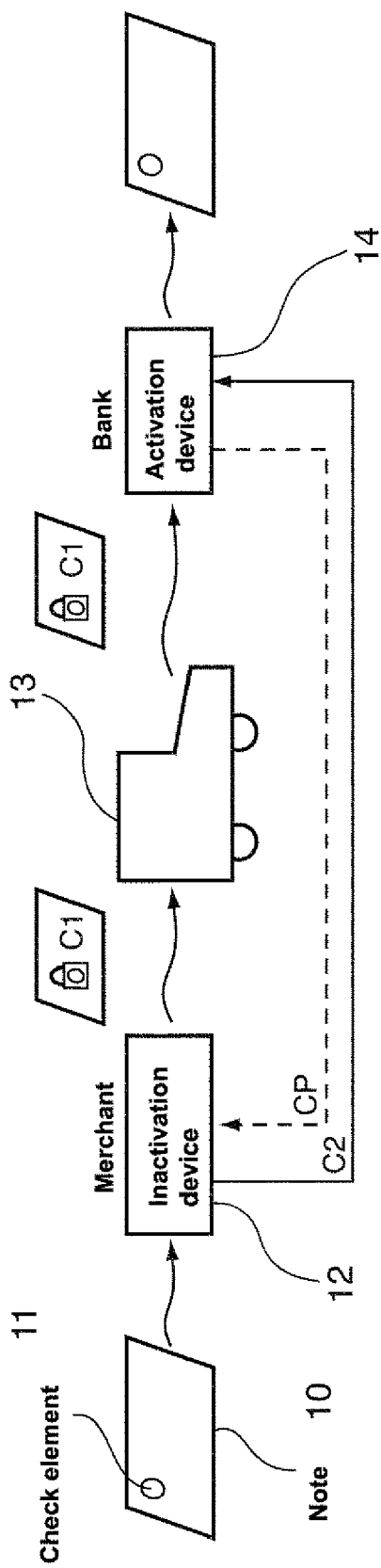
FIG. 1 illustrates one example of a system using an aspect of the disclosure.

Now will be presented in relation to FIG. 1 an example of a system using one embodiment of the disclosure.

A note 10 used for a transaction is considered. This note is equipped with a check element 11, notably permitting its authenticity to be checked.

Such a check element 11, for example a RFID type radio-tag, permits the note to adopt several states, notably according to the requests received from the different devices.

The different states of such a note, as well as the requests that it may receive and to which it responds in each state, are illustrated more precisely in FIG. 5, described below.

In the embodiment mentioned in the example, a merchant wishes to transfer securely notes to his bank and for this purpose uses an inactivation device 12 for each note.

Such a device of this specific embodiment of the disclosure permits the authentication capacities of the note 10 to be locked, by transmitting to it an inactivation code C1. In a colourful way, this inactivation of the note is the same as fitting a lock to the note, or more precisely to the check element of the note, and to transmitting a key C2, to the device 14 in charge of the reactivation of the note, permitting the lock to be opened.

In practice, an algorithm may notably be used, such as those used for encryption, such as for example AES-type ("Advanced Encryption Standard"), DES-type ("Data Encryption Standard") or HMAC-SHA-type ("keyed-Hash Message Authentication Code—Secure Hash Algorithm") algorithms.

For example, the inactivation and the reactivation of the note may use an asymmetric algorithm, using a public key and a private key. In this way, the inactivation code C1, corresponding to the "lock" fitted to the note, may use a CP public key sent by the activation device 14 to the inactivation device 12. The latter then transmits, at the time of the inactivation of the note, a private key C2 to the device 14, such as a function F (C1, C2) permits the validity of the reactivation of the note to be verified.

In another specific embodiment of the disclosure, the inactivation request does not comprise an inactivation code. The note, when it receives this request, generates a corresponding activation code, which will be required to reactivate it later. This code, calculated by the note according to the inactivation request, is transmitted to the device which emits this request, and is stored in the note, for later validation of a reactivation request. This code is then transmitted, by the inactivation device, to the activation device, in parallel to the transport of the inactivated notes.

In the embodiment described in FIG. 1, the note 10 thus rendered inactive is transported by a fund transport company 13 to the bank (which no longer needs to use an armoured vehicle).

The bank therefore receives an inactive note, namely on which a "lock" has been fitted corresponding to an inactivation code C1. To render the note active once more, the activation device 14 of the bank then emits an activation request to the note, notably comprising a code C2, received securely from the inactivation device 12.

The note which receives this activation request must combine the codes C1 and C2, that is to say to check if "the key C2 indeed allows the lock C1 to be opened", to validate the activation request and thus return to the active state.

If the request is validated, the note is then once again in a state where its authentication capacities are again active.

In another specific embodiment in which only one activation code is used, generated by the note at the time of the inactivation request, the note validates the activation request by comparing the activation code that it has in memory and that transmitted with the activation request. If these two codes match, then the request is validated and the note is again in the active state.

These two examples of inactivation and activation of notes ensure that only the holder of the correct activation code may reactivate an inactive note. In fact, in either case, the note only validates the activation request if it recognises the activation code corresponding to the inactivation request.

Figure 2:
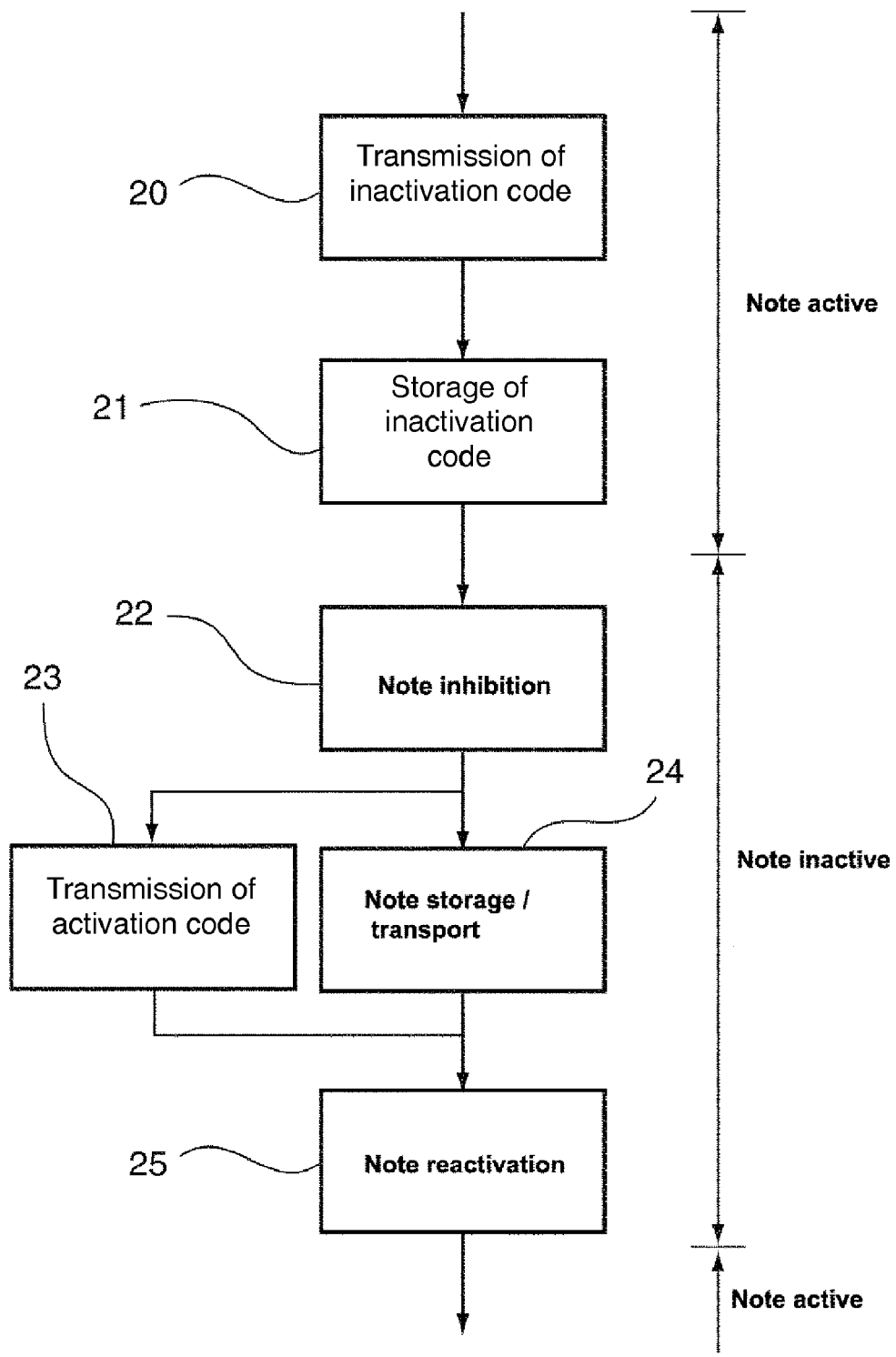
FIG. 2 illustrates one example of steps of the process for deterring the theft of notes in one specific embodiment of the disclosure.

FIG. 2 illustrates one example of the steps of the process in one specific embodiment of the disclosure, corresponding to the example described in FIG. 1.

A first step 20 for the transmission of an inactivation code to an active note is considered, step which for example may be used by an inactivation device by a merchant.

The process then comprises one storage step 21 of the inactivation code by the note, for later reactivation.

Once this inactivation code is stored, the check element of the note switches to a deactivated mode during one inhibition step 22 and the note is then in the inactive state.

The merchant must also transmit to the bank to which the note is addressed, the corresponding activation code for the invalidated note, in a transmission step 23 of the activation code.

To do so, a secured communication mode is used, for example via Internet.

In parallel to the transmission of the activation code, the inactive note is transported to the bank, during a transport step 24. The transfer of the note in this case does not require any particular security, as the note transported is rendered non reactive to an authentication request. In fact, an inactive note stolen during its transport cannot respond correctly to an authentication request and will thus be recognised as a stolen note.

In one variant of this embodiment, the process may also be used for making secure storage of the notes. In fact, the merchant may need to invalidate (or "put to sleep") notes to store them, for example during a week-end, and to then reactivate them so that they may be put back into circulation. In this case, the merchant may use note inactivation and activation devices, communicating with one another to transmit the activation codes. The activation and the inactivation may also be functions of a same device, which may also act as the authentication mechanism.

Once the note has been transferred to the bank, the latter may reactivate it using the activation code received in parallel. To do so, the process comprises a step for reactivating the note 25, implemented by an activation device. The latter then emits a specific activation request, destined to the inactive note, notably comprising the activation code received corresponding to the deactivated note.

The note, if it recognises the validity of the activation code, notably by means of a combination of the two inactivation and activation codes, will again return to an active state.

In another specific embodiment, the step 20 corresponds to the transmission of an inactivation request, without an inactivation code, and the step 21 corresponds to the generation, by the note, of an activation code for its subsequent reactivation. The following steps, 22, 23 and 24, are the same, the reactivation step 25 does not use a comparison of an inactivation code and an activation code, but a comparison between the activation code stored in 21 and that transmitted in the reactivation request in step 25.

Figure 3:
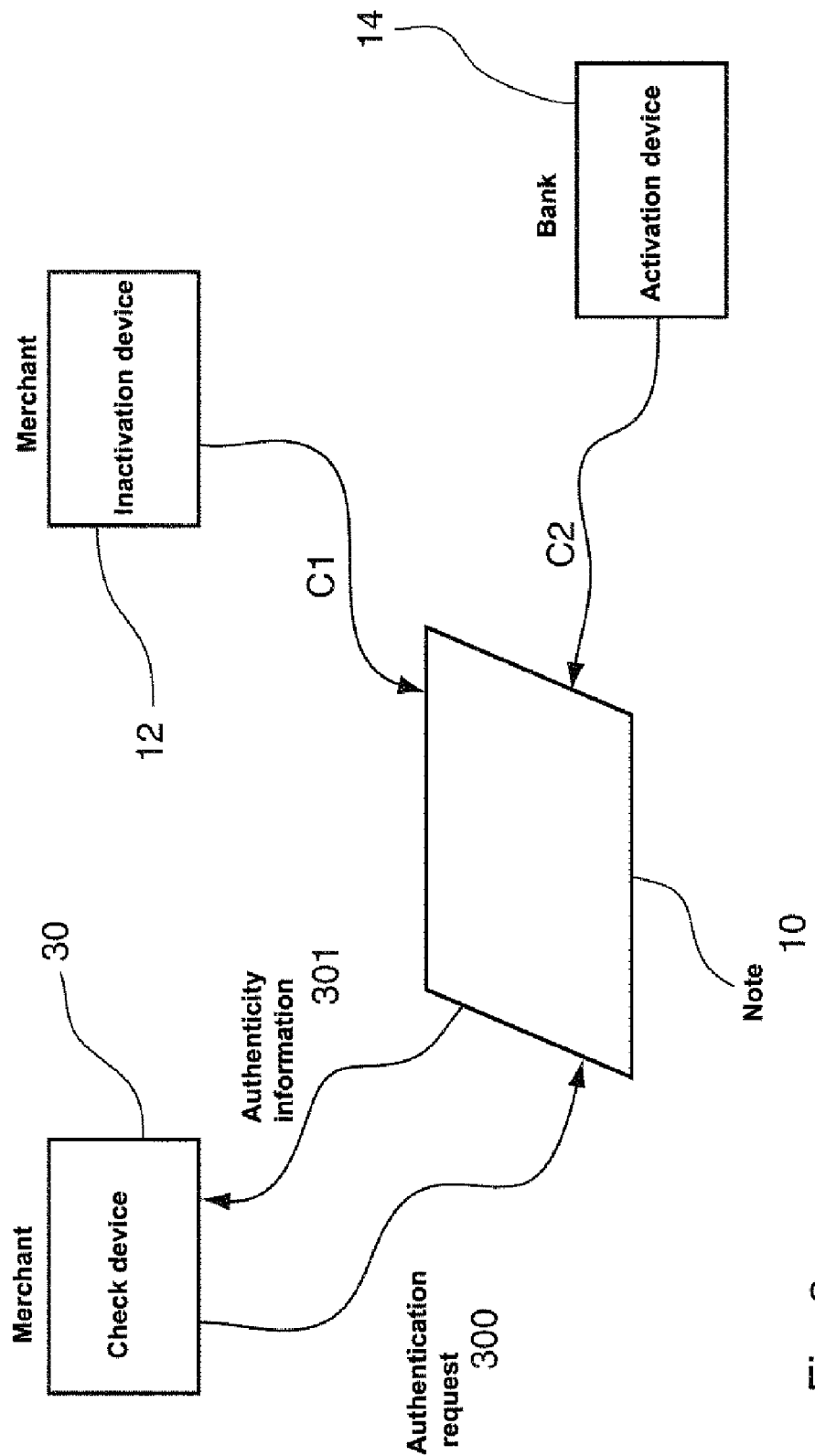
FIG. 3 shows a block diagram of a process of activation and inactivation of notes used in one embodiment of the disclosure.

Now will be presented in relation with FIG. 3, a block diagram of an activation and inactivation process for notes used in one embodiment of the disclosure.

A note 10 is considered equipped with a check element of the disclosure. Such a note is capable of responding to an authentication request 300 emitted by a check device 30, for example an authentication detector by a merchant to verify the validity of a note used during a transaction or an authentication detector used during a check of a ticket at the entrance to a sporting event or a show for example.

This authentication technique is itself known, as stated in the introduction.

The note 10 emits a response to this authentication request 300, or challenge, in the form of an item of authenticity information 301. Depending on whether the note is in the active or inactive state, this information 301 may adopt different values, such as an item of valid authenticity information (in the active state) or an item of invalid authenticity information (in the inactive state). In the case of an inactive note, it may also not emit a response to an authentication request.

This same note is also capable of receiving an inactivation request notably comprising a code C1, emitted by an inactivation device 12, for example by a merchant wishing to make notes inactive before transmitting them to a bank, or to store them securely.

Finally, such a note may be reactivated when it is in the inactive state, by an activation device 14 which transmits an activation request to it, comprising an activation code C2, corresponding to the inactivation code C1 previously received by the note.

This activation device 14 may be used for example by a central department, for the first emission of the note (which may also, by default, be in the active state from the beginning), then by banks, to reactivate a note.

In another specific embodiment, in which only one activation code is used, the code C1 is replaced by an inactivation request without an inactivation code, and the code C2 is generated by the note and transmitted to the activation device when the inactivation request is made. Then this device transmits this code C2 to the reactivation device.

Of course, batch processing of notes may be used, using suitable algorithms.

Figure 4:
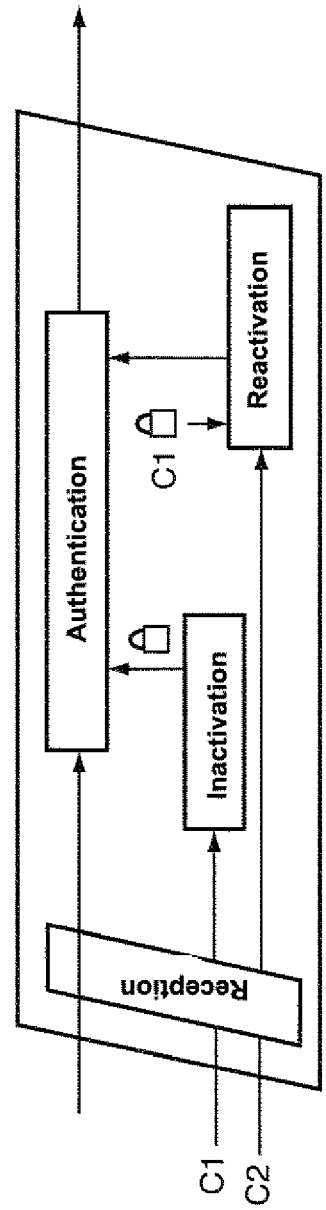
FIG. 4 shows, diagrammatically, the means used in one note of the disclosure.

Now will be presented, diagrammatically, in relation with FIG. 4, the means used in a note in one specific embodiment of the disclosure.

A note equipped with a check element is considered which permits it to receive and to respond to different requests, including authentication, inactivation and activation requests.

The note first of all has reception means for the different requests and then distinct response means for these different requests.

The response means to an authentication request permit the note to send an item of authenticity information, when it is in the inactive state.

The note also has means of managing an inactivation request, comprising or not an inactivation code C1 (corresponding to a lock) in the embodiment used, permitting the response means to be locked to an authentication request.

It also has means of storing this inactivation code C1, for later verification of the validity of an activation request.

In another embodiment, the note has means of generating an activation code and storing it.

The note also has means of managing a reactivation request, notably comprising an activation code C2. Such management means notably comprise means of validating the request, that is to say means of combining the stored inactivation code C1 and the received activation code C2. In this way, these validation means determine if "the key C2 permits the lock C1 to be unlocked". If this is the case, then the means for managing the reactivation request take into account this request and reactivate the request response means to an authentication request. Otherwise, the means for managing the reactivation request do not take this request into account and the note remains in the inactive state.

In another embodiment, these means of validating the request are in fact means of comparing the activation code received in this request and the activation code generated and stored at the time of the inactivation.

Figure 5:
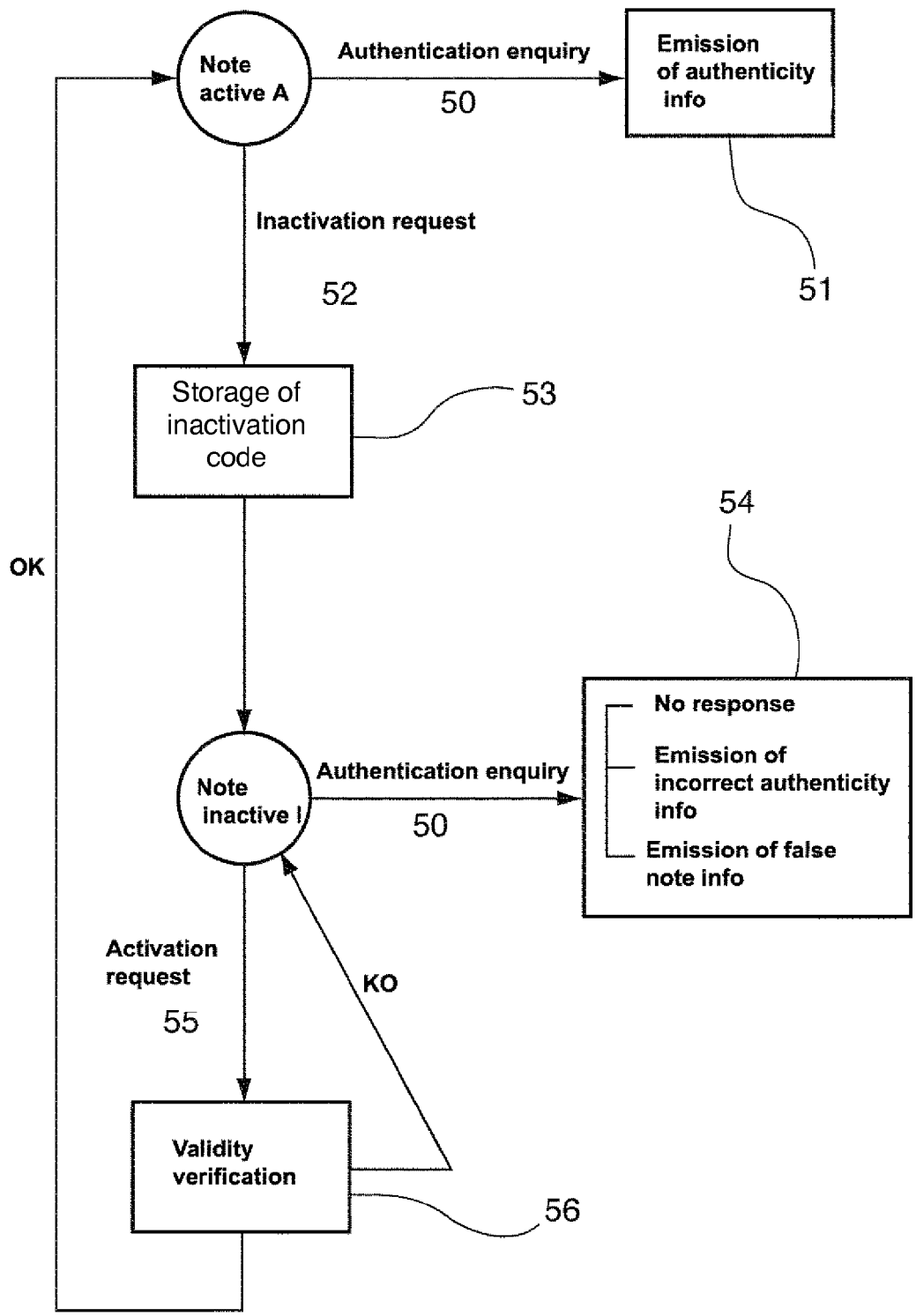
FIG. 5 shows one example of different states that a note may adopt in one specific embodiment of the disclosure.

Now will be presented, in relation with FIG. 5, an example of the different states that a note may adopt in one specific embodiment of the disclosure, as well as the different requests that it may receive and process.

A note is considered in the active A or valid state, which may receive at least two types of requests:
  an authentication request 50;
  an inactivation request 52.

The note may also receive an activation request, to which it will not respond as it is already in the active state.

In the case of the authentication request 50, as the note is active, it emits in response an item of authenticity information 51, permitting the device emitting the request to validate the use of the note.

In the case of an inactivation request 52, the note first stores at least one inactivation code, in a storage step 53, for later reactivation.

In one variant of this embodiment, the note may store information which permits it to reconstruct later the inactivation code, and to validate an activation request.

In yet another embodiment, the note itself generates an activation code, which it stores and emits, in response to the inactivation request.

Once this code, or the items of information permitting it to reconstruct this code, are stored, the note inhibits its response capacities to an authentication request, in one predetermined inactivity mode, and is then in the inactive I or invalid state.

This predetermined inactivity mode defines the response 54 of the note to an authentication request 50, which may adopt the following forms:

non response: the note is "silent" and does not respond to an authentication request;

incorrect response: the note emits an incorrect item of authenticity information, which does not correspond to any expected response;

non authenticity response: the note emits an explicit item of information of non authenticity or false note.

In the inactive state, the note may thus receive two types of request:

an authentication request 50;

an activation request 55.

If the note receives an inactivation request, it will not respond as it is already in the inactive state.

The possible responses in the case of an authentication request 50 have already been described above, in the predetermined inactivity mode, and are known to those skilled in the art.

In the case of an activation request 55, the note first determines the validity of the request, in a validity verification step 56. To do so, it uses the inactivation code or the items of information permitting it to reconstruct its inactivation code, stored in the inactivation step, and compares it to the activation code received in the reactivation request.

In another embodiment, the note uses the activation code stored previously, to compare it to the activation code received in the activation request.

If the request is validated, then the note is in the active state A, and regains its capacities to respond to authentication requests and to inactivation requests.

If the request is not validated, because the activation code is not recognised for example, the note remains in the inactive state I.

In the specific case of a definitive inactivation request, not shown in this figure, the note, regardless of its state, inhibits all of its response functions and becomes silent regardless of the request that it may receive.

One or more aspects of the present disclosure overcome disadvantages of the prior art.

More precisely, an aspect of the disclosure provides a technique that permits the theft of notes to be fought, notably during their transport or storage, efficiently and reliably.

Another aspect of the disclosure provides such a technique for deterring the theft of notes, which is relatively inexpensive and simple to implement.

Although the present disclosure have been described with reference to one or more examples, workers skilled in the art will recognize that changes may be made in form and detail without departing from the spirit and scope of the disclosure and/or the appended claims.

What is claimed is:

1. A process for deterring the theft of at least one note equipped with a radio-tag type authenticity check element, which returns an item of authenticity information, in response to an authentication request emitted by a check device, wherein said process comprises the following steps:

transmission to said check element of at least one inactivation request, rendering said check element inactivated and said note invalid;

delivery from said note of at least one activation code or at least one item of information permitting said activation code to be reconstructed;

secured transmission of said at least one activation code or said at least one item of information permitting said activation code to be reconstructed, to an activation device;

at least one step of storage or transport of said invalid note;

re-activation of said check element by said activation device, using at least said one activation code, rendering said note valid.

2. The process for deterring the theft of notes of claim 1, wherein said secured transmission step is carried out via Internet.

3. The process for deterring the theft of notes of claim 1, wherein said inactivation request comprises at least one inactivation code, stored by said note upon receipt of said inactivation request, and wherein said activation code is a function of said inactivation code.

4. The process for deterring the theft of notes of claim 1, wherein at least one of said activation code or an inactivation code are obtained using an algorithm belonging to a group comprising:

numbering algorithms;

MAC type algorithms;

hash algorithms.

5. The process for deterring the theft of notes of claim 1, wherein said notes may adopt at least two states belonging to a group comprising:

an active state, in which a note returns an item of authenticity information, in response to an authentication request;

an inactive state, in which a note does not return a response, following an authentication request, or delivers a non-authenticity response.

6. The process for deterring the theft of notes of claim 5, wherein, when said note is in the active state, said note responds to at least one request belonging to a group comprising:

an authentication request;

an inactivation request.

7. The process for deterring the theft of notes of claim 5, when said note equipped with said check element is in the active state and receives an inactivation request, wherein said process comprises an inhibition step, by said check element, of the capacity to respond to an authentication request, leading to a switching of said note to the inactive state.

8. The process for deterring the theft of notes of claim 6, when said note equipped with said check element is in the active state and receives an inactivation request, wherein said process comprises an inhibition step, by said check element, of the capacity to respond to an authentication request, leading to a switching of said note to the inactive state.

9. The process for deterring the theft of notes of claim 5, wherein, when said note is in the inactive state and receives an activation request, comprising at least one activation code, the process comprises the following steps:

verification of the validity of said activation code received depending on at least one of said activation code delivered by said note or an inactivation code, and delivery of an item of validity information, either positive or negative, for the re-activation;

switching of said note to the active state, if said validity information is positive.

10. The process for deterring the theft of notes of claim 6, wherein, when said note is in the inactive state and receives an activation request, comprising at least one activation code, the process comprises the following steps:

verification of the validity of the activation code received depending on at least one of said activation code delivered by said note or an inactivation code, and delivery of an item of validity information, either positive or negative, for the reactivation;

switching of said note to the active state, if said validity information is positive.

11. A note equipped with a radio-tag type authenticity check element, which returns an item of authenticity information, in response to an authentication request emitted by a check device, wherein said check element comprises:

inactivation means, in response to an inactivation request, rendering said note invalid;

means of delivery of at least one activation code or at least one item of information permitting said activation code to be reconstructed;

re-activation means, using at least one activation code, rendering said note valid.

12. An inactivation device for a radio-tag type authenticity check element equipping a note, which returns an item of authenticity information, in response to an authentication request emitted by a check device, wherein said check element comprises:

inactivation means, in response to an inactivation request, for rendering said note invalid;

means for delivery of at least one activation code or at least one item of information permitting said activation code to be reconstructed; and re-activation means, using at least one activation code, for rendering said note valid, and wherein said inactivation device comprises:

means for transmitting to said check element at least one inactivation request, rendering said note invalid; and means for storing at least one activation code or at least one item of information permitting said activation code to be reconstructed, delivered from said check element, for re-activation of said check element.

13. The inactivation device of claim 12, wherein the device comprises means of transmitting to at least one activation device the activation code, which renders said note valid.

14. An activation device for a radio-tag type authenticity check element equipping a note, which returns an item of authenticity information, in response to an authentication request emitted by a check device, wherein said check element comprises:

inactivation means, in response to an inactivation request, for rendering said note invalid;

means for delivery of at least one activation code or at least one item of information permitting said activation code to be reconstructed; and re-activation means, using at least one activation code, for rendering said note valid; and wherein said activation device comprises:

means for receiving at least one activation code or at least one item of information permitting said activation code to be reconstructed, delivered from said check element; and means for transmitting to said check element at least one activation code, rendering said note valid.

* * * * *